Patented Dec. 1, 1925.

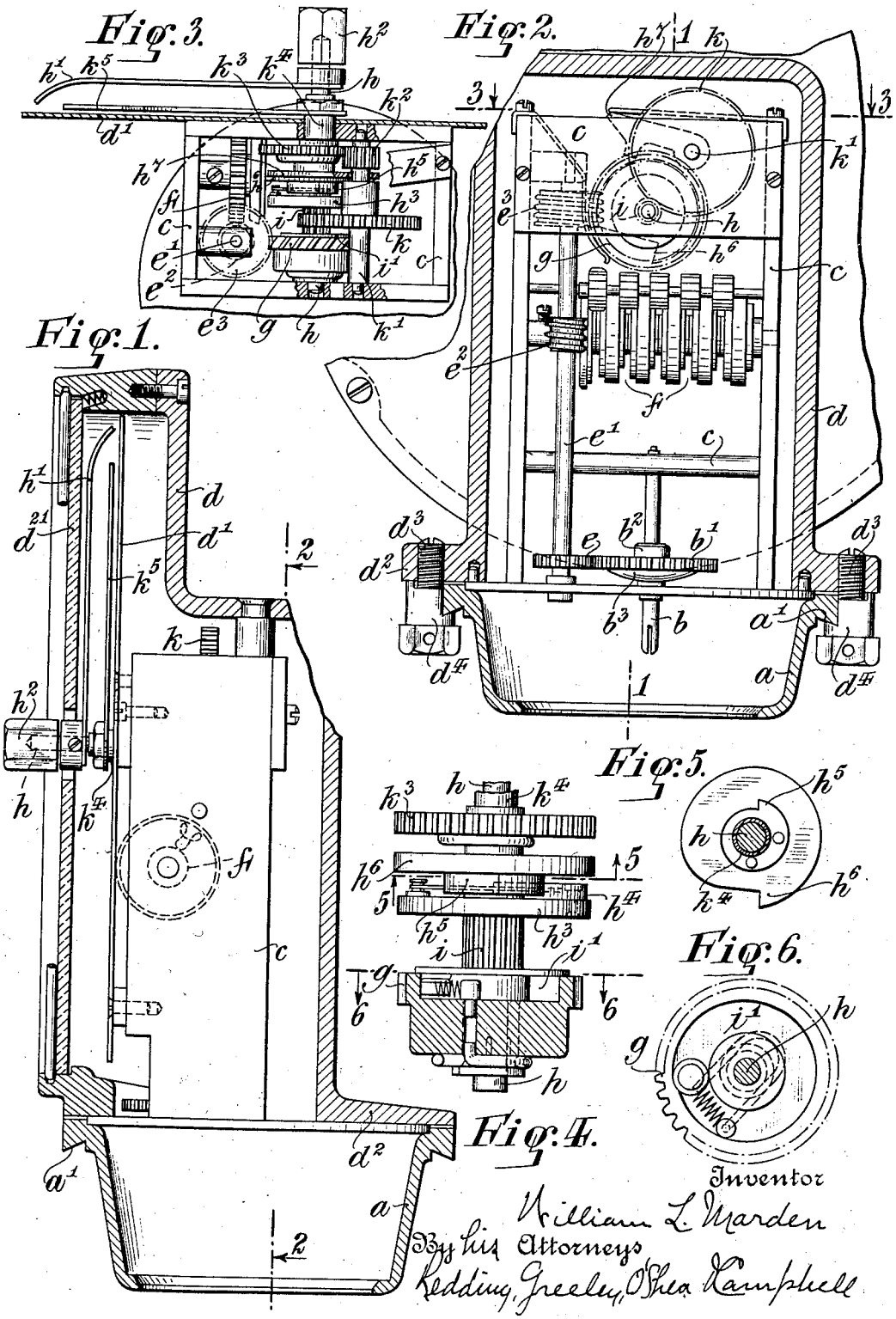

1,563,770

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

REGISTER FOR LIQUID-DISPENSING APPARATUS.

Original application filed November 29, 1924, Serial No. 752,837. Divided and this application filed May 12, 1925. Serial No. 29,681.

*To all whom it may concern:*

Be it known that I, WILLIAM L. MARDEN, a citizen of the United States, residing in the borough of Queens, of the city and State of New York, have invented certain new and useful Improvements in Registers for Liquid-Dispensing Apparatus, of which the following is a specification, reference being had to the accompanying drawing, forming a part hereof, this application being a division of application Serial Number 752,837, filed November 29, 1924.

This invention relates to devices by which the quantity of a liquid dispensed, as at a gasoline filling station, is indicated to the purchaser in units or fractions of units of volume or multiples thereof, while registration is also made, if desired, of the total volume delivered. It has for its object the provision of simple and compact mechanism which will indicate or register the volume of liquid dispensed at each sale or operation in the fraction of the unit volume or in multiples of the unit volume or both and after each sale or operation can be set back readily to zero in readiness for another operation. The invention will be described more fully hereinafter with reference to the accompanying drawing in which it is illustrated and in which—

Figure 1 is a view in side elevation of the registering devices, the casing of such devices and the casing of the upper portion of the metering device being shown in section on the plane indicated by the broken line 1—1 of Figure 2.

Figure 2 is a view of the registering mechanism in elevation as seen from the right hand in Figure 1, with the casing in vertical section on the plane indicated by the broken line 2—2 of Figure 1.

Figure 3 is a view of the parts shown in Figure 1 as seen from above, below the plane indicated by the broken line 3—3 of Figure 2, without the casing.

Figure 4 is a detail view of the set-back hand shaft and some of its appurtenances.

Figure 5 is a detail view of the cam stop plate with the shaft in section on the plane indicated by the broken line 5—5 of Figure 4.

Figure 6 is a detail view of the ball clutch hereinafter described, with the shaft in section on the plane indicated by the broken line 6—6 of Figure 4.

In the embodiment of the invention illustrated in the drawing there is shown at $a$ a portion of the casing of a disc meter of well known construction with which the improved registering devices are associated and from which they are driven through a shaft $b$ which is in engagement with the metering mechanism to be rotated thereby. The shaft $b$ is mounted in bearings in a frame $c$ which receives and supports the registering mechanism. A casing $d$ encloses the registering mechanism and supports a dial $d'$ for co-operation with the pointers or indicator hands hereinafter referred to.

The shaft $e'$ through a worm and worm gear indicated at $e^2$, drives a totalizing register of ordinary construction indicated at $f$, by which the total number of units of volume of liquid dispensed in successive operations is registered. The shaft $e'$ also carries a worm or skew gear $e^3$ which meshes with the corresponding worm or skew gear $g$ which is mounted frictionally on a shaft $h$. Through a clutch $i'$, preferably a ball clutch, rotation of the shaft in the opposite direction is prevented. In front of the dial $d'$ the shaft $h$ carries the unit pointer or indicator hand $h'$ which makes a complete revolution for each unit of volume of liquid which passes through the metering device, indicating by its position also a fractional part of the unit volume. The shaft $h$ also carries in front of the dial and in front of the protecting glass $d^{21}$ a knob or handle $h^2$ by which the unit pointer can be turned back to zero position after each operation.

Fixed on the shaft $h$ is a pinion $i$ which meshes with a gear $k$ on a counter shaft $k'$. A pinion $k^2$ on the shaft $k'$ meshes with a gear $k^3$ on a sleeve $k^4$ which is mounted loosely on the shaft $h$ and carries, in front of the dial $d'$, a pointer or indicating hand $k^5$. The gears $i, k, k^2$ and $k^3$ are so proportioned that for every complete revolution of the pointer $h'$ the pointer $k^5$ advances over one division of the scale formed on the dial whereby, for any operation of the registering mechanism, the pointer $k^5$ will register the total number of gallons or other units of volume dispensed and the pointer $h'$ will register the fraction of a unit of volume.

In order that the pointer $k^5$ shall be set to zero in the same operation with the setting of the pointer $h'$ there is fixed on the shaft $h$ a pawl carrier $h^3$ on which is mounted a spring pressed pawl $h^4$ adapted to engage a cam stop plate $h^5$ which is fixed on the sleeve $k^4$ of the pointer $k^5$, the pawl co-acting with the shoulder of this cam plate so that as the shaft $h$ is turned by hand towards zero the pawl $h^4$ engages the shoulder of the cam stop plate and the sleeve $k^4$ is turned with the shaft $h$. To insure the bringing of the pointers to rest at the zero position there is carried with the cam stop plate $h^5$ a second cam stop plate $h^6$, with its shoulder oppositely placed, so that when the pointers reach the zero position the shoulder of the cam stop plate $h^6$ will be engaged by a stop pawl $h^7$ and prevented from movement backward beyond the zero position. To permit the operation of setting back it is necessary that one of the gears of the train, such as the gear $k^3$, shall be frictionally mounted so that it may move during the operation of setting back although other parts of the gearing are necessarily restrained from motion through the resistance offered by the worm or skew gears.

The operation of the several parts of the improved structure has been set forth in connection with the description of the detailed construction and no further explanation of the operation of the structure as a whole is necessary.

I claim as my invention:

1. In a registering mechanism comprising a driving shaft, a unit indicator shaft carrying a unit pointer and having a resetting handle, and a skew gear on the driving shaft, a gear mounted loosely on the indicator shaft to co-act with said skew gear, and a clutch interposed between the loosely mounted gear and the indicator shaft to transmit rotation to the indicator shaft and to permit it to be independently rotated.

2. In a registering mechanism comprising a driving shaft, a unit indicator shaft carrying a unit pointer and having a resetting handle and transmitting gearing between the driving shaft and the indicator shaft, a clutch forming a part of said gearing adapted to transmit rotation to the indicator shaft and to permit it to be independently rotated, a sleeve mounted on the indicator shaft and carrying a pointer, reduction gearing between the indicator shaft and said sleeve, a pawl and a stop cam carried by the indicator shaft and the sleeve, a second stop cam carried by the sleeve, and a stop pawl in operative relation with said second stop cam.

3. In a registering mechanism comprising a driving shaft, a unit indicator shaft carrying a unit pointer and having a resetting handle, and transmitting gearing between the driving shaft and the indicator shaft, a clutch forming a part of said gearing adapted to transmit rotation to the indicator shaft and to permit it to be independently rotated, a sleeve mounted on the indicator shaft and carrying a pointer, a pinion on the indicator shaft, a gear mounted frictionally on the sleeve, and a parallel shaft having a gear in engagement with the pinion on the indicator shaft and a pinion in engagement with the gear on the sleeve.

4. In a registering mechanism comprising a driving shaft, a unit indicator shaft carrying a unit pointer and having a resetting handle, and transmitting gearing between the driving shaft and the indicator shaft, a clutch forming a part of said gearing adapted to transmit rotation to the indicator shaft and to permit it to be independently rotated, a sleeve mounted on the indicator shaft and carrying a pointer, a pinion on the indicator shaft, a gear mounted frictionally on the sleeve, a parallel shaft having a gear in engagement with the pinion on the indicator shaft and a pinion in engagement with the gear on the sleeve, means to couple the indicator shaft and the sleeve for resetting, and a stop cam and a co-acting pawl on the sleeve and indicator shaft.

5. In a registering mechanism comprising a driving shaft, a unit indicator shaft carrying a unit pointer and having a resetting handle, and transmitting gearing between the driving shaft and the indicator shaft, a clutch forming a part of said gearing adapted to transmit rotation to the indicator shaft and to permit it to be independently rotated, a sleeve mounted on the indicator shaft and carrying a pointer, a pinion on the indicator shaft, a gear mounted frictionally on the sleeve, a parallel shaft having a gear in engagement with the pinion on the indicator shaft and a pinion in engagement with the gear on the sleeve, means to couple the indicator shaft and the sleeve for resetting, a stop cam and a co-acting pawl on the sleeve and indicator shaft, a second stop cam on the sleeve, and a stop pawl in operative relation with said second stop cam.

This specification signed this 8th day of May A. D. 1925.

WILLIAM L. MARDEN.